(Model.)
A. N. MATTHEWS.
PACKING FOR VALVE STEMS, &c.
No. 245,002. Patented Aug. 2, 1881.
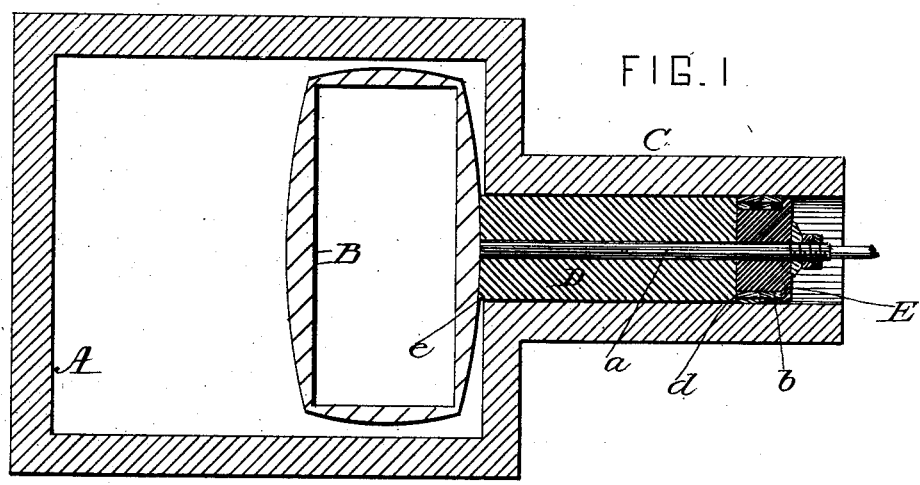
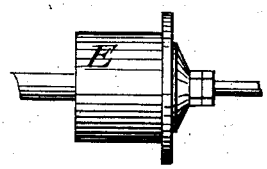
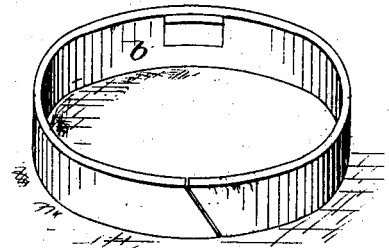
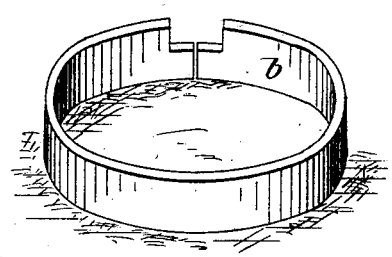
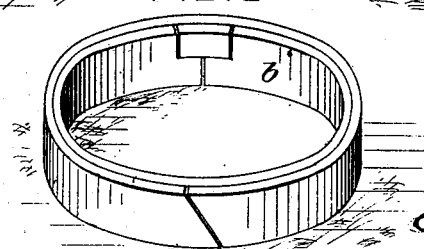
WITNESSES;
INVENTOR;

UNITED STATES PATENT OFFICE.

ABRAM N. MATTHEWS, OF NORWOOD, MASSACHUSETTS.

PACKING FOR VALVE-STEMS, &c.

SPECIFICATION forming part of Letters Patent No. 245,002, dated August 2, 1881.

Application filed March 3, 1881. (Model.)

*To all whom it may concern:*

Be it known that I, ABRAM NAPIER MATTHEWS, of Norwood, in the county of Norfolk and State of Massachusetts, have invented a new and useful Improvement in Packing for Valve-Stems of Steam and other Engines, of which the following is a specification, such as will enable others skilled in the art to which it pertains to make and use the same, reference being had to the accompanying drawings, which form part of said specification.

The same letters will indicate like parts in all the figures.

My invention relates to the packing of valve-stems of steam and other engines, and may be applied to the piston-rods of steam-engines.

The object of this invention is to lessen the friction due to the forward and backward movement of the valve-stem or piston-rod; also to guide the rod in a true line and prevent it from wabbling when the rock-shaft or other valve-stem connection is out of line, particularly in locomotives and oscillating engines; also to obviate the necessity of stuffing-boxes and their packing, and consequently the wear of the valve-stem or piston-rod.

My invention consists in the combination, with the stem of a valve or piston-rod, of a detachable thimble or cylinder having a hole centrally through it which snugly fits the rod, said thimble having its ends made to fit the valve-yoke on one end and the piston-head and rings on the other, the latter forming a ground or tight joint, serving in the place of the usual follower, and also to so nearly fit its inclosing-cylinder as to prevent the valve-stem from wabbling when it is overstrained or getting out of line from any external cause; also, in the combination and arrangement, with the hub or piston-head, of the packing-rings constructed with break-joints in such a manner that they are prevented from turning on each other—that is to say, that the outer ring is provided with an inner projection and the inner ring with a corresponding reception-recess, the projection being equal in thickness to that of the inner ring, by which a smooth joint is formed. These rings fit over the hub or head, which has on one of its sides a flange, the other side abutting against the end of the thimble aforesaid, thus forming a space or recess, in which said rings are secured.

Referring more particularly to the accompanying drawings and to the letters of reference marked thereon, Figure 1 represents a plan view of a steam-chest having a cylindrical projection in which is located my improvement, the thimble, piston-head, and rings being in horizontal section. Fig. 2 shows the flanged hub or piston-head detached. Fig. 3 shows the piston-rings mounted on the head, which is shown in dotted lines. Fig. 4 is a perspective view of the outside packing-ring, showing the inward projection. Fig. 5 is a perspective view of the inner ring, showing the recess into which the projection on the outer ring fits. Fig. 6 is also a perspective view of the two packing-rings put together.

A is a steam-chest; B, the valve-yoke; C, the cylindrical projection in which my improved guide and piston-head operate. D is the thimble, E the piston-head, and $b$ packing-rings.

The length of the thimble is governed by the length of the stroke of the valve, but must in all cases be such that the piston-head will not extend outside of the cylindrical projection of the valve-chest, and must project inwardly far enough to prevent the valve or valve-yoke from touching the walls of the steam-chest.

$a$ shows the valve stem or rod; $b$, the packing-rings; $c$, the flange on head E. $d$ is the thimble end which forms the follower, and $e$ the end abutting against the valve-yoke.

The diameter of the thimble is a little less than the bore of the cylinder C. The annular opening thus made between them forms a steam-space. The steam in this space balances perfectly the outer sides of the thimble, which so nearly fills the cylinder that very little of the face of the piston-head is exposed to the pressure of the steam in the chest. Thus it will be seen that the thimble and piston-head have but little resistance from the steam in their backward and forward movements.

The operation is as follows: The cylindrical projection of the valve-chest being properly bored, the valve and valve-yoke are then placed in position. The yoke and thimble are then properly joined at $e$. The other end of the thimble is turned true, and also the inner end of the piston-head. This part of the head and the thimble end are ground together or made otherwise steam-tight, as shown at $d$. A screw-nut or other fastening is secured to the rod and against the piston-head, rigidly securing all the parts together.

It will be observed that the parts are easily removed and replaced; that the construction is simple, cheap, and durable. The danger of the valve-stem getting out of line is entirely avoided, and therefore the true working of the valve is thereby secured.

I am aware that it is not new to attach a cylindrical projection to the valve-chest and to pack the valve-stem by means of a piston and rings; but I am not aware that a thimble nearly equal in diameter to the bore of the cylinder and interposed between the piston-head and valve-yokes, one end of said thimble forming the follower to the piston-head, and so arranged that but little surface is exposed to the steam-pressure, thereby lessening the friction on the working-bearings, was ever before used.

What I therefore claim as my invention, and desire to secure by Letters Patent, is—

1. The combination, in packing for valve-stems, of the stem $a$, detachable thimble D, of the same diameter throughout, filling the cylinder and abutting against the yoke at end $c$, and against the piston-head at end $d$, (latter serving the purpose of the usual follower,) and the packing-rings $b$, all constructed and arranged to operate in the cylindrical projection of the steam-chest A in the manner shown and described.

2. The combination, with the steam-chest provided with the cylindrical projection C, of the detachable thimble, one end of which forms the follower, the other end projecting into and beyond the walls of said chest, thereby lessening the resistance of the steam-pressure, the piston-head, provided with one flange, by which a recess is formed between said flange and thimble for the reception of the packing-rings, and the valve-stem and gland, all arranged to operate as shown and described.

In testimony whereof I have signed my name to this specification in the presence of two subscribing witnesses.

ABRAM NAPIER MATTHEWS.

Witnesses:
  THOS. E. CLARY,
  JOS. H. ADAMS.